(12) United States Patent
Chang et al.

(10) Patent No.: US 8,291,158 B2
(45) Date of Patent: Oct. 16, 2012

(54) APPARATUS, SYSTEM, AND METHOD FOR ENFORCING POLICY CONTROLS FOR NON-SYSTEM MANAGED TAPE MEDIA

(75) Inventors: Jean Rawwei Chang, Santa Clara, CA (US); Erika Marianna Dawson, Tucson, AZ (US); Jon Arthur Lynds, San Jose, CA (US); Michael Ray Noel, Tucson, AZ (US); Linda Jean Schiltz, Flagstaff, AZ (US); Michael William Wood, Warwick (GB)

(73) Assignee: International Business Machines Corporation, Armonk, NY (US)

( * ) Notice: Subject to any disclaimer, the term of this patent is extended or adjusted under 35 U.S.C. 154(b) by 1596 days.

(21) Appl. No.: 11/037,711

(22) Filed: Jan. 18, 2005

(65) Prior Publication Data

US 2006/0161730 A1    Jul. 20, 2006

(51) Int. Cl.
*G06F 12/00*    (2006.01)
(52) U.S. Cl. .............................. 711/111; 711/4; 711/154
(58) Field of Classification Search .............. 711/4, 111, 711/154
See application file for complete search history.

(56) References Cited

U.S. PATENT DOCUMENTS

| | | | |
|---|---|---|---|
| 3,715,727 A | 2/1973 | Yu | 340/172.5 |
| 5,438,674 A | 8/1995 | Keele et al. | 395/404 |
| 6,154,787 A | 11/2000 | Urevig et al. | 710/8 |
| 6,529,996 B1 | 3/2003 | Nguyen et al. | 711/114 |
| 6,636,875 B1 * | 10/2003 | Bashant et al. | 707/201 |
| 6,658,526 B2 | 12/2003 | Nguyen et al. | 711/111 |
| 6,947,237 B2 * | 9/2005 | Christie, Jr. | 360/60 |
| 7,100,010 B2 * | 8/2006 | Kato et al. | 711/163 |
| 7,627,617 B2 * | 12/2009 | Kavuri et al. | 1/1 |
| 2002/0035665 A1 | 3/2002 | Basham et al. | 711/112 |
| 2003/0067701 A1 * | 4/2003 | Christie, Jr. | 360/60 |

OTHER PUBLICATIONS

Tanenbaum, Andrew S., "Structured Computer Organization", 1984, Prentice-Hall, Inc., 2nd Edition, pp. 10-12.*
Ahead Software AG, "Nero Express 6: User's Guide", 2003, www.nero.com.*
"CNS /Update Newsletter Feature: Robotic Tape Library Expands Internal Backup Capacity", May 13, 1999, UF Computing & Networking Services, CNS Document ID: u970802a. Jun. 29, 2008 <docweb.cns.ufl.edu/update/u970802a/u970802a.pdf>.*
Weiser, Jeri, "CD Creation FAQs", Mar. 22, 2002, Board of Regents of the University of Wisconsin System. Sep. 9, 2008 <http://web.archive.org/web/20030914033743/http://www.uwec.edu/Help/CDBurner/faqs.htm>.*
"Model SA-11S1 User Guide", Aug. 2004, Marantz. Mar. 10, 2009 <http://us.marantz.com/DFU_SA11S1_Final_Eng.pdf>.*

* cited by examiner

*Primary Examiner* — Arpan P. Savla
(74) *Attorney, Agent, or Firm* — Kunzler Law Group, PC

(57) ABSTRACT

An apparatus, system, and method are disclosed for enforcing policy controls for non-system managed tape media. The apparatus includes an operating system configured to communicate with a tape media drive, and an identification module configured to identify a tape media type of a tape media cartridge. The apparatus may also include a policy module configured to maintain control policies for tape media types, and a media control module configured to enforce the control policies. The system includes a computing system having a processor, a cache, an operating system, and a plurality of input/output interfaces, a tape media drive coupled to the computing system, and the apparatus. The method includes communicating with a tape media drive, identifying a tape media type of a tape media cartridge, maintaining a plurality of control policies for tape media types, and enforcing the plurality of control policies.

24 Claims, 6 Drawing Sheets

APPARATUS, SYSTEM, AND METHOD FOR ENFORCING POLICY CONTROLS FOR NON-SYSTEM MANAGED TAPE MEDIA

BACKGROUND OF THE INVENTION

1. Field of the Invention

This invention relates to tape media control and more particularly relates to standalone computing system tape requests and a tiered media control policy to prevent inadvertent writes to tape media.

2. Description of the Related Art

The explosion of data created by e-business is making data storage a strategic investment priority for companies of all sizes. As data storage matters take precedence, two major concerns have emerged: business continuity and business efficiency. Business continuity requires storage that supports data availability so employees, customers and trading partners can access data continuously through reliable, disaster-tolerant systems. Business efficiency, where storage is concerned, is the need for investment protection, reduced total cost of ownership, high performance, and manageability.

Computer data is frequently stored in secondary, long-term storage devices such as disk drives and tape drives. Such data is often critical to the proper operation of various computer applications. While the data itself may have a very high priority, proper maintenance and preservation of the data through data backup and restore operations typically has a very low priority. Backup and recovery of data is often a lengthy process that requires significant bandwidth and server processing resources.

For tape storage applications, data is stored onto a magnetic tape medium, such as a metallic ribbon, within a tape cartridge using a tape drive. The tape medium conventionally is designed to include a plurality of tracks that are distributed across the physical width of the tape medium and run the physical length of the tape medium. A tape write head within the tape drive is typically capable of writing up to sixteen tracks at one time, starting at one end of the tape and moving along the length of the tape. When the tape write head reaches the end of the tape, the head is aligned over the proximate track set, the direction of the tape is reversed, and the write head writes an additional sixteen tracks in the opposite direction. This "serpentine" pattern may continue until all tracks have been written.

Tape drives are generally employed in two systems: automated tape libraries, and standalone or non-system managed tape drives. Automated tape libraries are known for providing cost effective storage and retrieval of large quantities of data. The data in automated data storage libraries is stored on removable tape media that are, in turn, stored on storage shelves or the like inside the library in a fashion that renders the media, and its resident data, accessible for physical retrieval by robotic arms often called accessors. Automated tape libraries are controlled by a virtual tape server that implements security policies, read/write policies, and the like.

A standalone system may be any computing system such as a server, desktop pc, or the like, with a tape media drive. Due to the capacity of tape media, which is currently approaching a terabyte, computing systems often employ tape media drives and tape media cartridges to perform backups. There are currently approximately 8 tape media types, each media type supporting a different function.

One example of a popular media type is a Write Once Read Many (WORM) tape media. WORM tape media is often useful for situations requiring an unalterable, digital copy of data such as insurance policies, legal documents, etc. WORM tape media is generally more expensive than other types of tape media. Inadvertent write operations to WORM tape media is costly because the WORM tape media cannot be reused or reinitialized.

The problem of inadvertent write operations to WORM tape media is most relevant to standalone systems because of human error. With a standalone system, a user must physically insert a tape media cartridge into a tape drive before using the tape media cartridge. Users are prone to errors, and in some cases may mistakenly place WORM tape media in the tape drive in place of another intended tape media. However, the standalone system has no operating system tape media controls for preventing inadvertent write operations. Inadvertent media insertion errors may similarly occur with other types of storage media.

From the foregoing discussion, it should be apparent that a need exists for an operating system apparatus, system, and method that enforces tape media policies for non-system managed tape media. The proliferation of new media types, combined with the irreversible write once characteristics of WORM tape media make such a system even more critical.

SUMMARY OF THE INVENTION

The present invention has been developed in response to the present state of the art, and in particular, in response to the problems and needs in the art that have not yet been fully solved by currently available standalone tape systems. Accordingly, the present invention has been developed to provide an apparatus, system, and method for enforcing operating system policy controls for non-system managed tape media that overcome many or all of the above-discussed shortcomings in the art.

The apparatus to enforce policy controls is provided with a plurality of modules configured to functionally execute the necessary steps. These modules in the described embodiments include an identification module configured to identify a tape media type of a tape media cartridge, a policy module configured to maintain a plurality of control policies for tape media types, and a media control module configured to enforce the plurality of control policies.

In one embodiment, the media control policy is configured to optionally enforce the plurality of control policies for non-specified tape media types. Alternatively, the media control policy is configured to enforce the plurality of control policies regardless of the tape media type. In a further embodiment, the apparatus includes tiered control policies having at least a first, second, and third tier.

The first tier may include a control policy for standalone non-specified Write Once Read Many (WORM) tape media. The second tier may include a control policy for standalone pre-specified media types. The third tier comprises a control policy for all standalone non-specified tape media. In one embodiment, the media control module is further configured to unload an identified improper media type and prompt for a correct media type.

A system of the present invention is also presented to enforce policy controls for non-system managed tape media. In particular, the system, in one embodiment, includes a computing system having a processor, a cache, an operating system, a plurality of input/output interfaces, and a tape media drive operatively coupled to the computing system and configured to receive a tape media cartridge. In one embodiment, the operating system is configured to communicate with the tape media drive, and includes an identification module configured to identify a tape media type of a tape media cartridge, a policy module configured to maintain a plurality of control policies for tape media types, and a media control module configured to enforce the plurality of control policies.

A method of the present invention is also presented for enforcing policy controls on non-system managed tape media. The method in the disclosed embodiments substantially includes the steps necessary to carry out the functions presented above with respect to the operation of the described apparatus and system. In one embodiment, the method includes communicating with a tape media drive, identifying a tape media type of a tape media cartridge, maintaining a plurality of control policies for tape media types, and enforcing the plurality of control policies.

In one embodiment the method may include optionally enforcing the plurality of control policies for non-specified tape media types. Additionally, the method includes enforcing tiered control policies having at least a first, second, and third tier. In a further embodiment, the method includes unloading an identified improper media type and prompting for a correct media type.

Reference throughout this specification to features, advantages, or similar language does not imply that all of the features and advantages that maybe realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
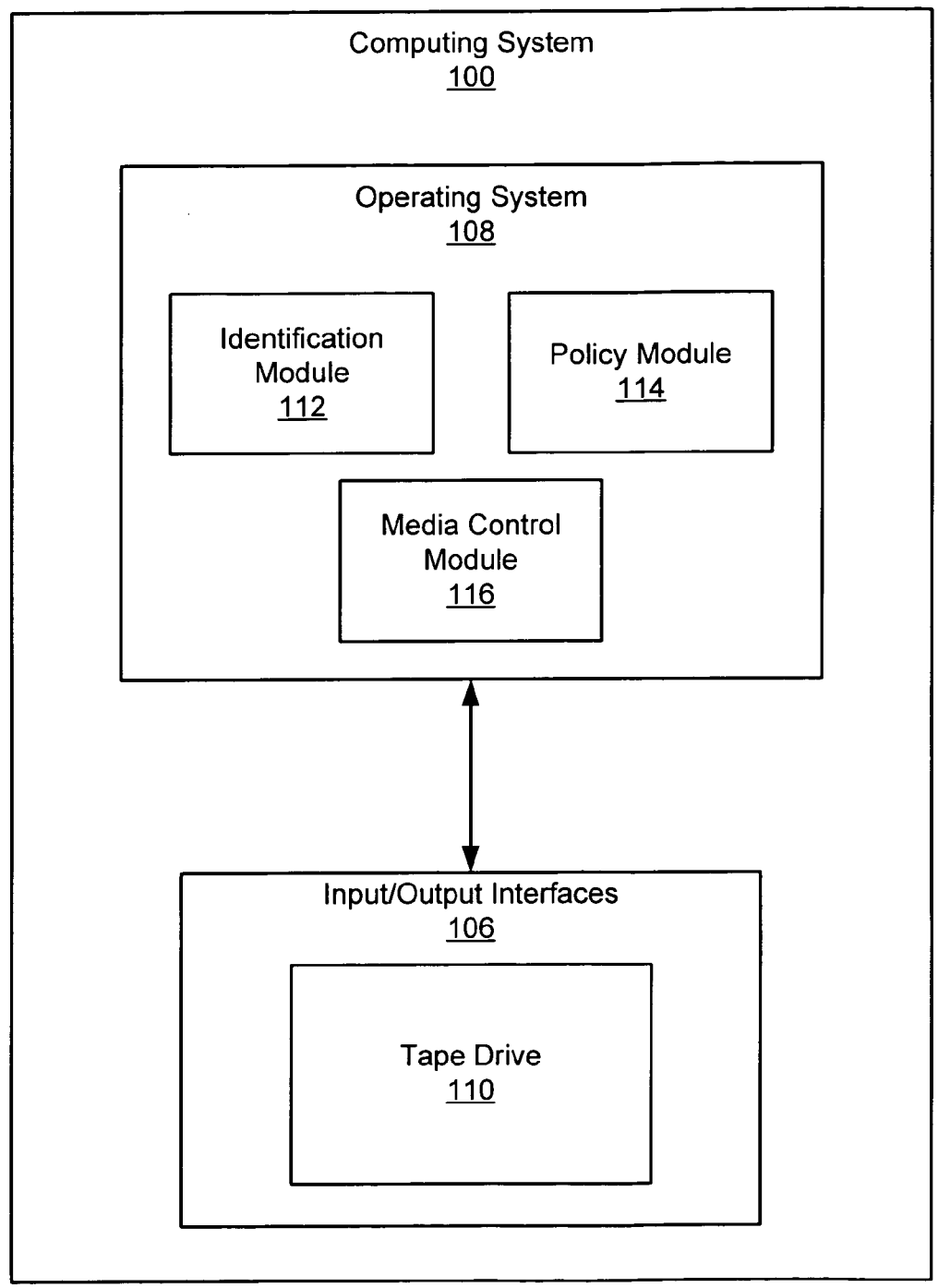
FIG. 1 is a schematic block diagram illustrating one embodiment of a computing system for enforcing policy controls in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. The software may include computer-readable code stored on a storage device and integrated into a computing system. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a computing system 100 for enforcing policy controls in accordance with the present invention. In one embodiment, the computing system 100 comprises a processor (not shown), cache memory (not shown), a plurality of input/output interfaces 106, and an operating system 108. The computing system 100 may be a server, a desktop pc, portable computer, handheld computer, or any device having a processor, cache memory, and an operating system 108.

In one embodiment, the plurality of input/output interfaces 106 includes a tape drive 110. The tape drive 110 is configured to receive tape media cartridges and read and/or write data with respect to the tape media cartridges. One example of a tape drive 110 suitable for use with the present invention is the D/T 3592 available from IBM® of Armonk, N.Y. Alternatively, any removable media and corresponding storage drive may be used with the apparatus, system, and method of the present invention, such as, but not limited to, optical media, flash media, and magnetic media.

In a further embodiment, the operating system 108 includes an identification module 112, a policy module 114, and a media control module 116. The identification module 112 is configured to identify a tape media type of a tape media cartridge. Currently, there are approximately 8 different types of media that will be described in further detail with reference to FIG. 3. The identification module 112 may communicate an identification request with the tape drive 110. In one embodiment, the identification module 112 is configured to issue a "media sense" command and wait for a response from the tape drive 110.

The policy module 114 may be configured to maintain a plurality of control policies for tape media types. The plurality of control policies will be discussed in greater detail with reference to FIG. 4. The media control module 116 is configured to enforce the plurality of control policies.

Prior art media controls for non-system managed require a tape management subsystem with tape pooling. Since tape pool media controls are not integral to the operating system 108, the tape pool media controls must be configured separately and are not verified or enforced by the operating system 108. The present invention integrates media control configuration policies for tape media with the operating system 108 and may be configured to enforce tape pooling media controls, and/or to exclusively enforce the use of a certain type of tape media. In one embodiment, the operating system 108 may comprise z/OS® and the media controls may be integrated into System Managed (SMS) policies. Alternatively, the operating system 108 may comprise Windows, Linux, Unix, AIX, BSD, or the like. As used herein, system managed tape media refers to tape media that is part of an automated tape system, and likewise, non-system managed tape media refers to tape media that is not part of an automated tape system. Or in other terms, non-system managed tape media refers to tape media that is part of a standalone tape or computing system, such as the computing system 100.

Figure 2:
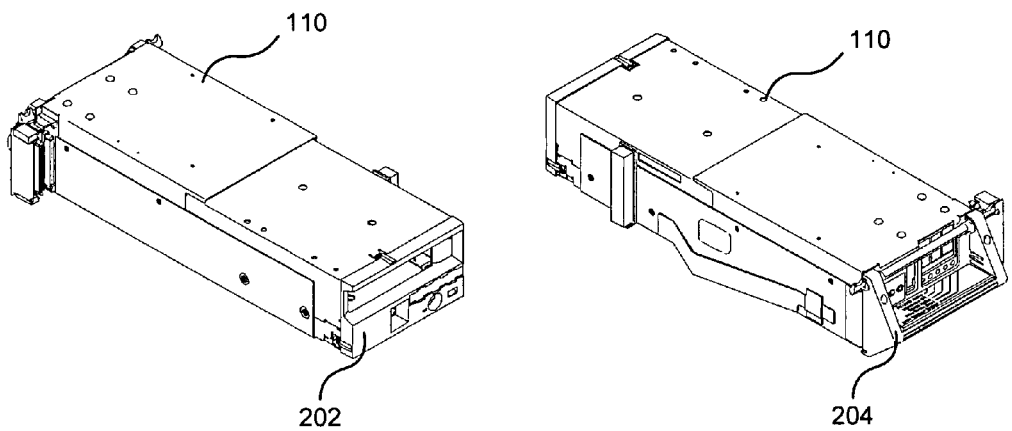
FIG. 2 is a perspective view diagram illustrating one embodiment of a tape drive that may be installed in the computing system in accordance with the present invention.

FIG. 2 is a perspective view diagram illustrating one embodiment of a tape drive 110 that may be installed in the computing system 100 of FIG. 1. Specifically, FIG. 2 depicts the front 202 and rear 204 of the tape drive 110. In the depicted embodiment, the tape drive 110 comprises a removable tape drive mounted in a drive canister. The tape drive 110 may be replaced with any removable storage media drive such as, but not limited to, magnetic or optical disk drives, electronic media drives, or other computer readable removable media drives.

Figure 3:
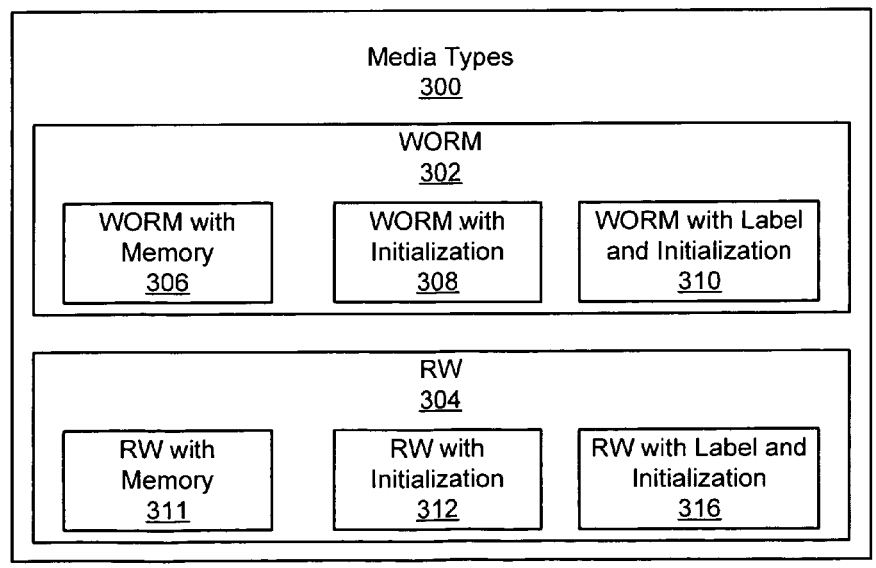
FIG. 3 is a schematic block diagram illustrating one embodiment of a plurality of tape media types in accordance with the present invention.

FIG. 3 is a schematic block diagram illustrating one embodiment of a plurality of tape media types 300 suitable for use with the present invention. In one embodiment, the tape drive 110 is configured to read and write to a plurality of tape media types 300. The tape media types 300 may include both Write Once Read Many (WORM) tapes 302 and Read/Write (RW) tapes 304. WORM tapes 302 store data in a non-erasable, non-rewritable format. Such a format is intended to help support long term retention of data and meet requirements of regulatory bodies, such as medical and legal regulatory bodies. WORM tapes 302 may have security features that are designed to prevent the alteration or deletion of stored data while allowing data to be appended to existing tape cartridges or files.

The tape media types 300 may include variations of WORM 302 and RW 304, such as WORM and RW with cartridge memory 306,311, WORM and RW initialized 308, 312, and WORM and RW with initialization and labels 310, 316. The cartridge memory chip stores access history and media performance each time the tape cartridge is unloaded from the tape drive 110. The history and media performance data may be used to analyze and report tape drive and tape cartridge usage, and also to determine if the tape media inside the cartridge is degrading over time.

Additionally, the tapes WORM and RW 302, 304 may be initialized, or formatted, or left uninitialized. Finally, WORM and RW 302, 304 tapes may be labeled and initialized 310, 316. Labels are generally required for operation in automated tape library systems, however labels may or may not be required in standalone systems such as the computing system 100 of FIG. 1. As recognized by one skilled in the art, any combination of the above described media types may be made and utilized in the tape drive 110. Additionally, many types of tape media have not been described with reference to FIG. 3, however, as new types of media are created the tape drive 110 is capable of reading and writing to the new types of media.

Figure 4:
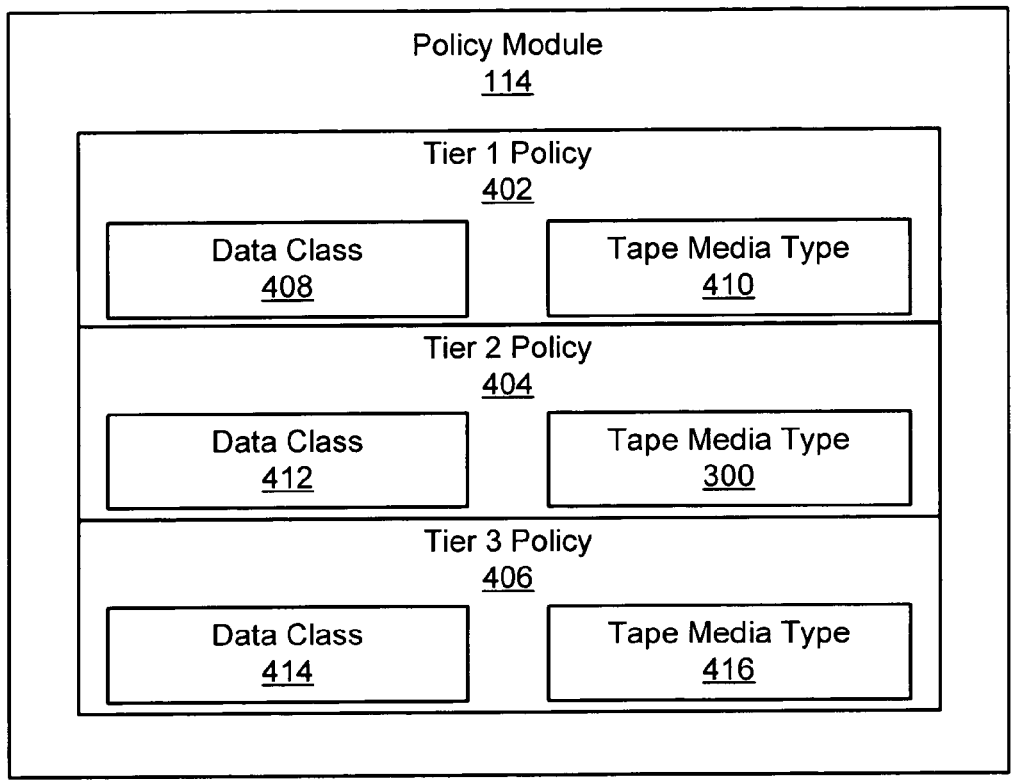
FIG. 4 is a schematic block diagram illustrating one embodiment of the policy module 114 in accordance with the present invention.

FIG. 4 is a schematic block diagram illustrating one embodiment of the policy module 114 in accordance with the present invention. The policy module 114, in one embodiment, is configured to maintain a plurality of control policies. The control policies may be tiered and may include at least a first 402, a second 404, and a third 406 tier. Alternatively, a control policy tier may be configured for each type of media or for each data class. In a further embodiment, all types of media may be grouped to fall into one of the three control policy tiers 402, 404, 406. Each tier 402, 404, 406 also preferably includes specified data classes that may require a certain type of media 300. For example, a data class containing insurance policies may require WORM tape media in order to prevent the data from being overwritten or deleted.

The first tier 402 may comprise a control policy for a non-specified data class requiring WORM tape media. The first tier 402 maintains a plurality of data classes 408 that have not been specified in other tiers 404, 406. The first tier 402 may be set to require WORM tape media for the data classes 408.

In one embodiment, the second tier 404 comprises a control policy for standalone pre-specified media types, such as the media types described above with reference to FIG. 3. The second tier 404 includes specified data classes 412 and the corresponding specified media types 300. The third tier 406 comprises a control policy for enforcing optional data class 414 media policies for all standalone non-specified tape media types. For example, certain data classes 414 may not specify a required media type and therefore may be written to any media type.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
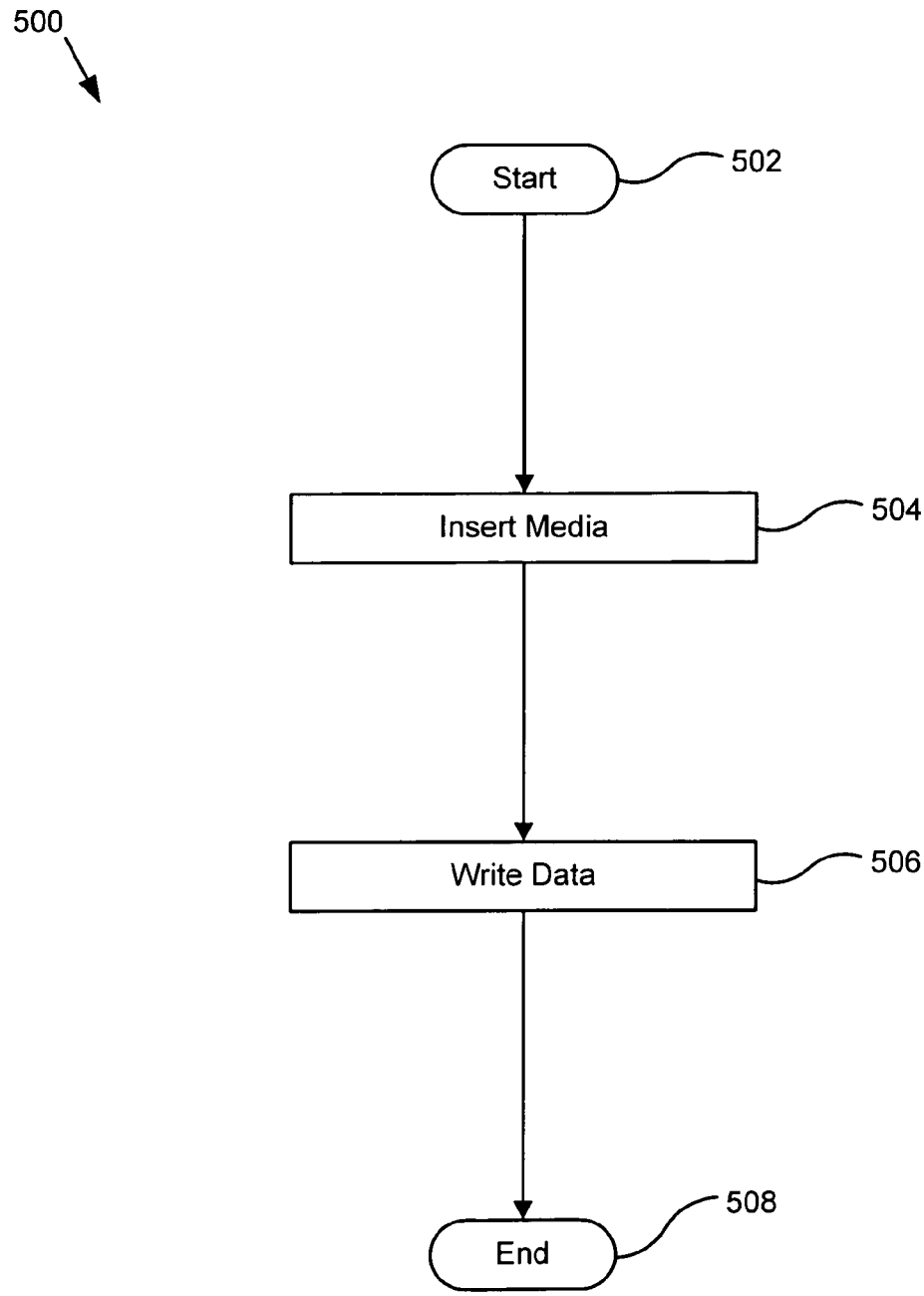
FIG. 5 is a schematic flow chart diagram illustrating one embodiment of a method for enforcing control policies in accordance with the prior art.

FIG. 5 is a schematic flow chart diagram illustrating one embodiment of a method 500 for enforcing control policies in accordance with the prior art. In one embodiment, the method 500 starts 502 and a user inserts 504 a tape cartridge having tape media. The operating system 108 writes 506 data to the tape media and the method 500 ends. No safeguards are in place to prevent writing data to costly WORM media.

Figure 6:
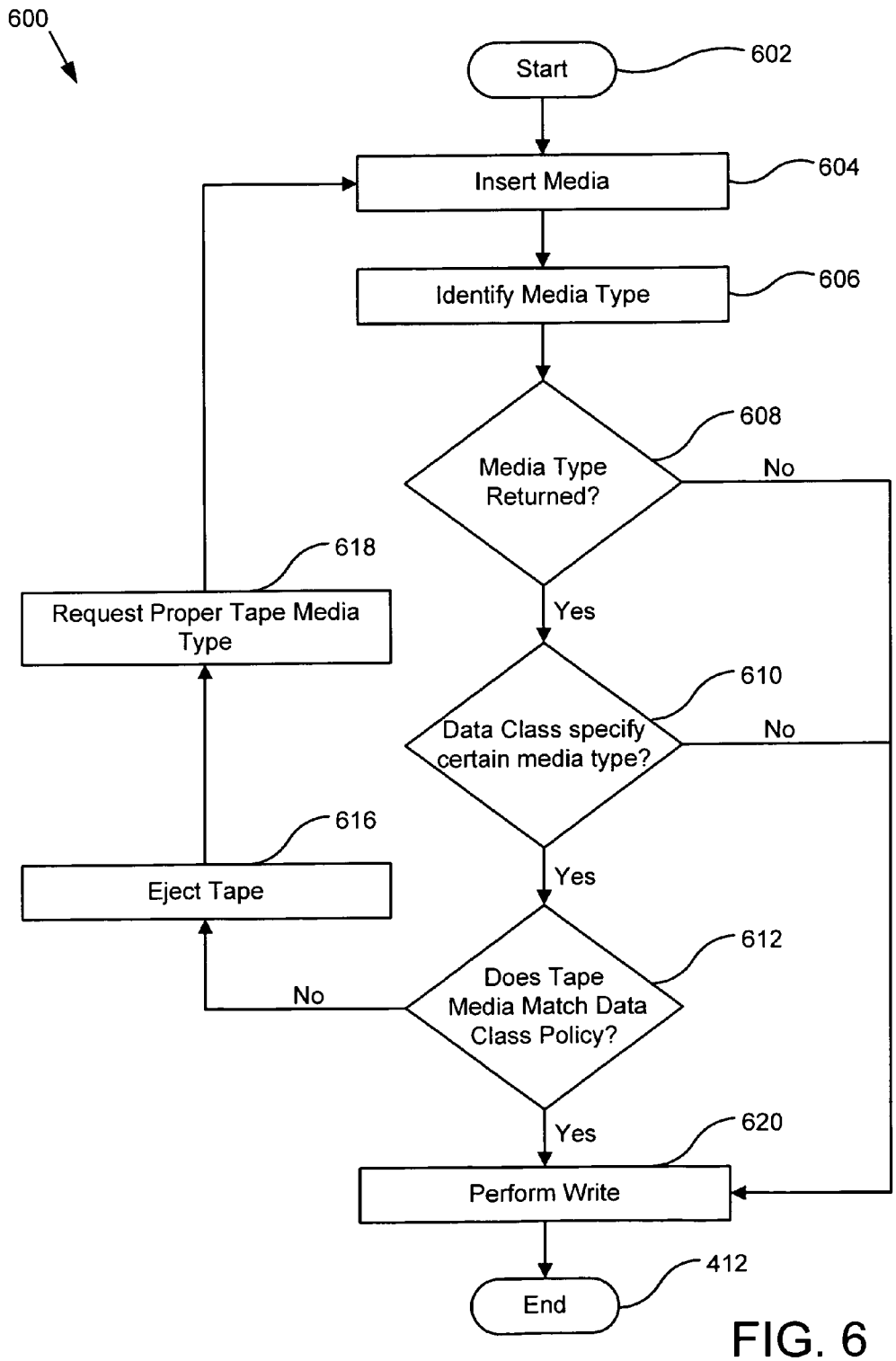
FIG. 6 is a schematic flow chart diagram illustrating one embodiment of a method for enforcing control policies of non-system managed tape media in accordance with the present invention.

FIG. 6 is a schematic flow chart diagram illustrating one embodiment of a method 600 for enforcing control policies of non-system managed tape media in accordance with the present invention. The method 600 starts 602 and a user inserts 604 a tape cartridge having tape media. The identification module 112 then identifies 606 the tape media. In one embodiment, identifying 606 the tape media comprises issuing a "MEDIUM SENSE" command to the tape drive 110. The tape drive 110 attempts to identify the tape media and if the type is identifiable, the tape drive 110 returns 608 the tape media type to the operating system 108.

The operating system 108 then identifies the data class requesting to be written to the tape media and the media control module 116 compares the data class with the policy module 114. If the policy module 114 matches the data class, and a policy is specified 610 for the data class, the media control module 116 enforces the control policy. If the media type specified 610 matches 612 the tape media in the tape drive 110 then the operating system 108 writes 614 the data to the tape media.

For example, the media control module 116 may detect that a data class is specified in the second tier 404, and that the data class requires WORM media with memory 306. If the tape media in the tape drive 110 matches 612 the required WORM media with memory 306 then the media control module 116 will allow the data to be written to the tape media. If the tape media does not match 612, the operating system 108 may rewind, unload, and eject 616 the tape media. The operating system 108 then displays a message requesting 618 that the user insert 604 the proper tape media type.

Figure 7:
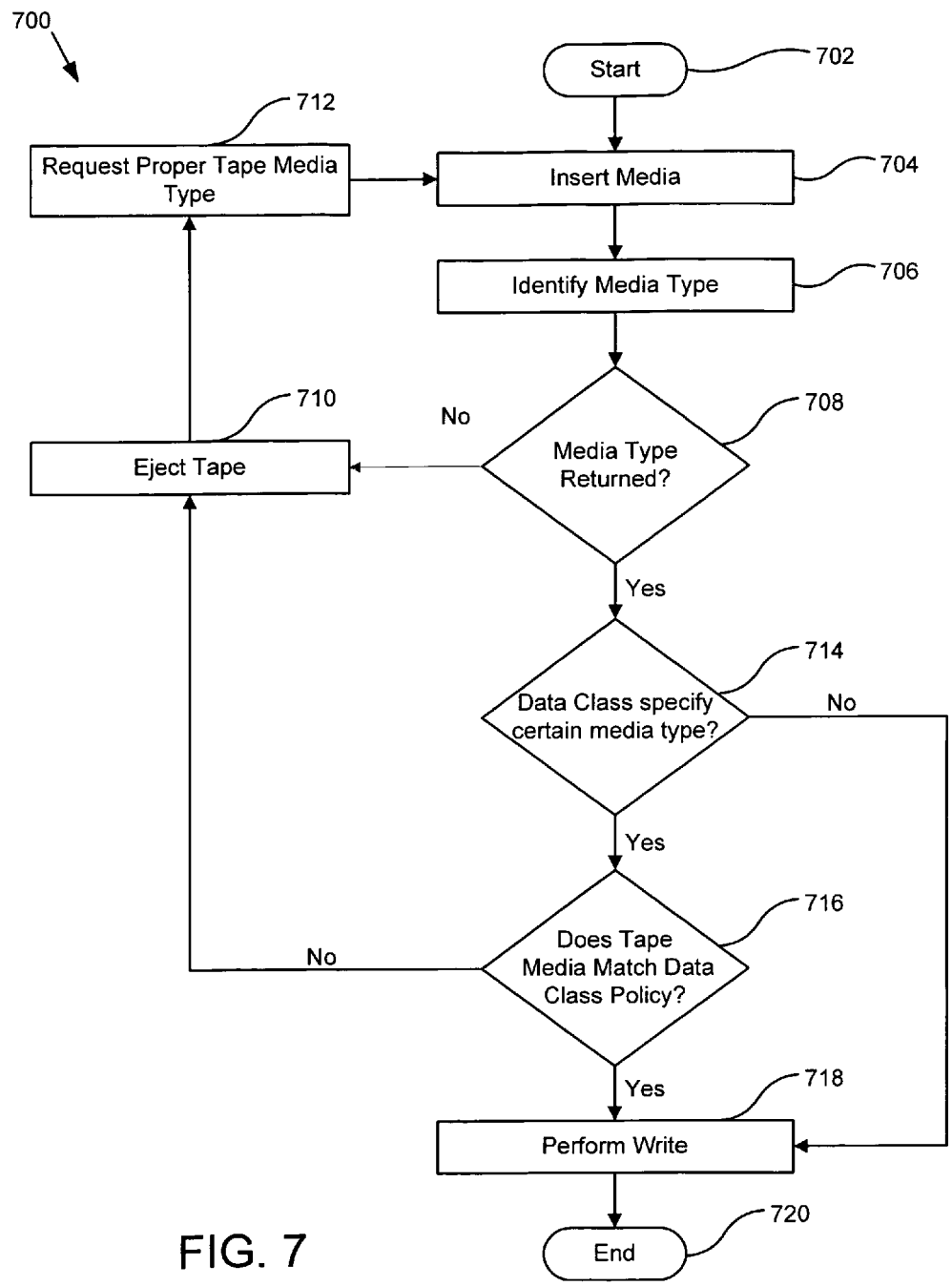
FIG. 7 is a schematic flow chart diagram illustrating an alternative embodiment of a method for enforcing control policies of non-system managed tape media in accordance with the present invention.

In one embodiment, if the tape media type is not returned 608, the media control module 116 verifies the control policy of the data. If the data class does not specify a tape media type (for example third tier 406), then the operating system 108 performs 614 the write operation, and the method 600 ends FIG. 7 is a schematic flow chart diagram illustrating an alternative embodiment of a method 700 for enforcing control policies of non-system managed tape media in accordance with the present invention. In one embodiment, the method 700 starts 702 and the user inserts 704 a tape cartridge into the tape drive 110. The identification module 112 then identifies 706 the tape media type by issuing a command to the tape drive 110 as described above with reference to FIG. 6. If the tape drive 110 does not return 708 a tape media type, the operating system 108 rewinds, unloads, and ejects 710 the tape. The operating system 108 then displays a message requesting 712 that the user insert 704 the proper tape media type.

The operating system 108 then identifies the data class requesting to be written to the tape media and the media control module 116 compares the data class with the policy module 114. If the policy module 114 matches the data class, and a policy is specified 714 for the data class, the media control module 116 enforces the control policy. If the media type specified 714 matches 716 the tape media in the tape drive 110 then the operating system 108 performs 718 the write operation to the tape media.

If media control module 116 does not match 714 the data class with a specified control policy in the policy module 114, the operating system performs 718 the write operation. However, if media control module 116 does match 714 the data class, and if the tape media type does not match 716 the data class specification, then the tape is ejected 710 as described above. If the tape media type does match 716 the data class specification then the operating system 108 performs 718 the write operation and the method 700 ends 720.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to enforce policy controls for non-system managed tape media, the apparatus comprising:
    an identification module comprising executable code stored on a physical storage device, executed by a processor, and configured to identify a tape media type of a tape media cartridge retrieved by a robotic accessor of an automated tape library, the tape media type comprising one of Write Once Read Many (WORM) tape media and Read/Write (RW) tape media;
    a policy module comprising executable code stored on the physical storage device, executed by the processor, and configured to maintain a plurality of control policies for tape media types, the control policies comprising a first tier that requires WORM tape media for non-specified data classes and a second tier for pre-specified data classes that requires a corresponding media type for each of the pre-specified data classes, wherein the non-specified data classes comprise all data classes except the pre-specified data classes; and
    a media control module comprising executable code stored on the physical storage device, executed by the processor, and configured to enforce the plurality of control policies.

2. The apparatus of claim 1, wherein the media control module is configured to optionally enforce the plurality of control policies for non-specified tape media types.

3. The apparatus of claim 1, wherein the media control module is configured to enforce the plurality of control policies regardless of the tape media type.

4. The apparatus of claim 1, wherein the tape media type further comprising WORM tape media with cartridge memory, WORM tape media with initialization, and WORM tape media with initialization and label.

5. The apparatus of claim 1, wherein the media control module is further configured to unload an identified improper tape media type and prompt for a correct tape media type.

6. A system to enforce policy controls for non-system managed tape media, the system comprising:
- a computing system having a processor, a cache, an operating system, and a plurality of input/output interfaces;
- a tape media drive operatively coupled to the computing system and configured to receive a tape media cartridge from a robotic accessor of an automated tape library, the operating system configured to communicate with the tape media drive;
- an identification module comprising executable code stored on a physical storage device, executed by the processor, and configured to identify a tape media type of the tape media cartridge, the tape media type comprising one of WORM tape media and RW tape media;
- a policy module comprising executable code stored on the physical storage device, executed by the processor, and configured to maintain a plurality of control policies for tape media types, the control policies comprising a first tier that requires WORM tape media for non-specified data classes and a second tier for pre-specified data classes that requires a corresponding media type for each of the pre-specified data classes, wherein the non-specified data classes comprise all data classes except the pre-specified data classes; and
- a media control module comprising executable code stored on the physical storage device, executed by the processor, and configured to enforce the plurality of control policies.

7. The system of claim 6, wherein the media control module is configured to optionally enforce the plurality of control policies for non-specified tape media types.

8. The system of claim 6, wherein the media control module is configured to enforce the plurality of control policies regardless of the tape media type.

9. The system of claim 6, wherein the tape media type further comprising WORM tape media with cartridge memory, WORM tape media with initialization, and WORM tape media with initialization and label.

10. The system of claim 6, wherein the media control module is further configured to unload an identified improper tape media type and prompt for a correct tape media type.

11. A program of machine-readable instructions stored on a physical storage device and executable by a digital processing apparatus to perform an operation to enforce policy controls for non-system managed tape media, the operation comprising:
- communicating with a tape media drive;
- identifying a tape media type of a tape media cartridge retrieved by a robotic accessor of an automated tape library, the tape media type comprising one of WORM tape media and RW tape media;
- maintaining a plurality of control policies for tape media types, the control policies comprising a first tier that requires WORM tape media for non-specified data classes and a second tier for pre-specified data classes that requires a corresponding media type for each of the pre-specified data classes, wherein the non-specified data classes comprise all data classes except the pre-specified data classes; and
- enforcing the plurality of control policies.

12. The program of machine-readable instructions of claim 11, wherein the instructions further comprise an operation to optionally enforce the plurality of control policies for non-specified tape media types.

13. The program of machine-readable instructions of claim 11, wherein the instructions further comprise an operation to enforce the plurality of control policies regardless of the tape media type.

14. The program of machine-readable instructions of claim 11, wherein the instructions further comprise an operation to unload an identified improper tape media type and prompt for a correct tape media type.

15. A method for enforcing policy controls for non-system managed tape media, the method comprising:
- communicating with a tape media drive;
- identifying a tape media type of a tape media cartridge retrieved by a robotic accessor of an automated tape library, the tape media type comprising one of WORM tape media and RW tape media;
- maintaining a plurality of control policies for tape media types, the control policies comprising a first tier that requires WORM tape media for non-specified data classes and a second tier for pre-specified data classes that requires a corresponding media type for each of the pre-specified data classes, wherein the non-specified data classes comprise all data classes except the pre-specified data classes; and
- enforcing the plurality of control policies.

16. The method of claim 15, further comprising optionally enforcing the plurality of control policies for non-specified tape media types.

17. The method of claim 15, further comprising unloading an identified improper tape media type and prompt for a correct tape media type.

18. A method for deploying a computing infrastructure, comprising integrating computer-readable code stored on a physical storage device into a computing system, wherein the code in combination with the computing system is capable of enforcing policy controls for non-system managed tape media, the enforcement of policy controls comprising:
- communicating with a tape media drive;
- identifying a tape media type of a tape media cartridge retrieved by a robotic accessor of an automated tape library, the tape media type comprising one of WORM tape media and RW tape media;
- maintaining a plurality of control policies for tape media types, the control policies comprising a first tier that requires WORM tape media for non-specified data classes and a second tier for pre-specified data classes that requires a corresponding media type for each of the pre-specified data classes, wherein the non-specified data classes comprise all data classes except the pre-specified data classes; and
- enforcing the plurality of control policies.

19. The method of claim 18, wherein the enforcement of policy controls further comprises optionally enforcing the plurality of control policies for non-specified tape media types.

20. The method of claim 18, wherein the enforcement of policy controls further comprises unloading an identified improper tape media type and prompt for a correct tape media type.

21. An apparatus to enforce policy controls for non-system managed tape media, the apparatus comprising:

means for communicating with a tape media drive, the communication means comprising executable code stored on a physical storage device and executed by a processor;

means for identifying a tape media type of a tape media cartridge retrieved by a robotic accessor of an automated tape library, the tape media type comprising one of WORM tape media and RW tape media, the identifying means comprising executable code stored on the physical storage device and executed by the processor;

means for maintaining a plurality of control policies for tape media types, the control policies comprising a first tier that requires WORM tape media for non-specified data classes and a second tier for pre-specified data classes that requires a corresponding media type for each of the pre-specified data classes, wherein the non-specified data classes is comprise all data classes except the pre-specified data classes, the maintaining means comprising executable code stored on the physical storage device and executed by the processor; and means for enforcing the plurality of control policies, the enforcing means comprising executable code stored on the physical storage device and executed by the processor.

22. The apparatus of claim 1, wherein the pre-specified data classes comprise an insurance policy data class.

23. The system of claim 6, wherein the pre-specified data classes comprise an insurance policy data class.

24. The program of machine-readable instructions of claim 11, wherein the pre-specified data classes comprise an insurance policy data class.

* * * * *